Figure 1:
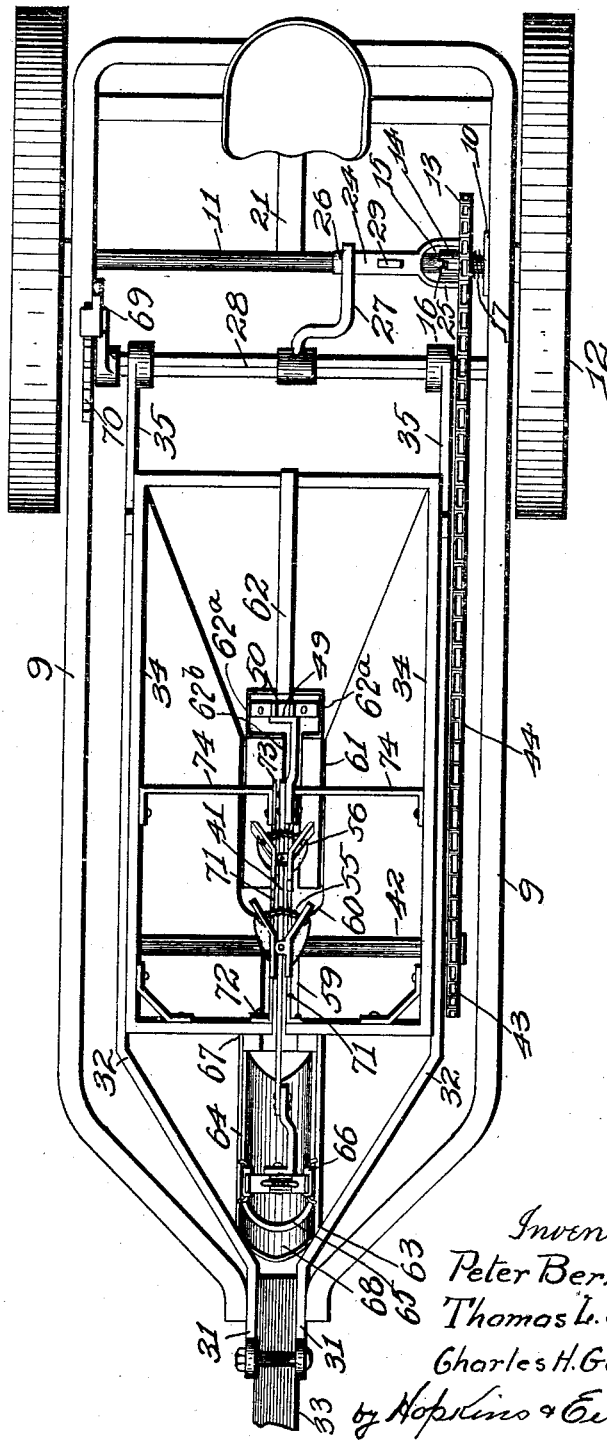

P. BERNHARDT, T. L. GOOD & C. H. GERLING.
POTATO PLANTER.
APPLICATION FILED OCT. 5, 1908.

931,178.

Patented Aug. 17, 1909.
4 SHEETS—SHEET 1.

Witnesses
W. C. Stein
L. A. L. McIntyre

Inventors
Peter Bernhardt
Thomas L. Good.
Charles H. Gerling.
by Hopkins & Eicks Attys

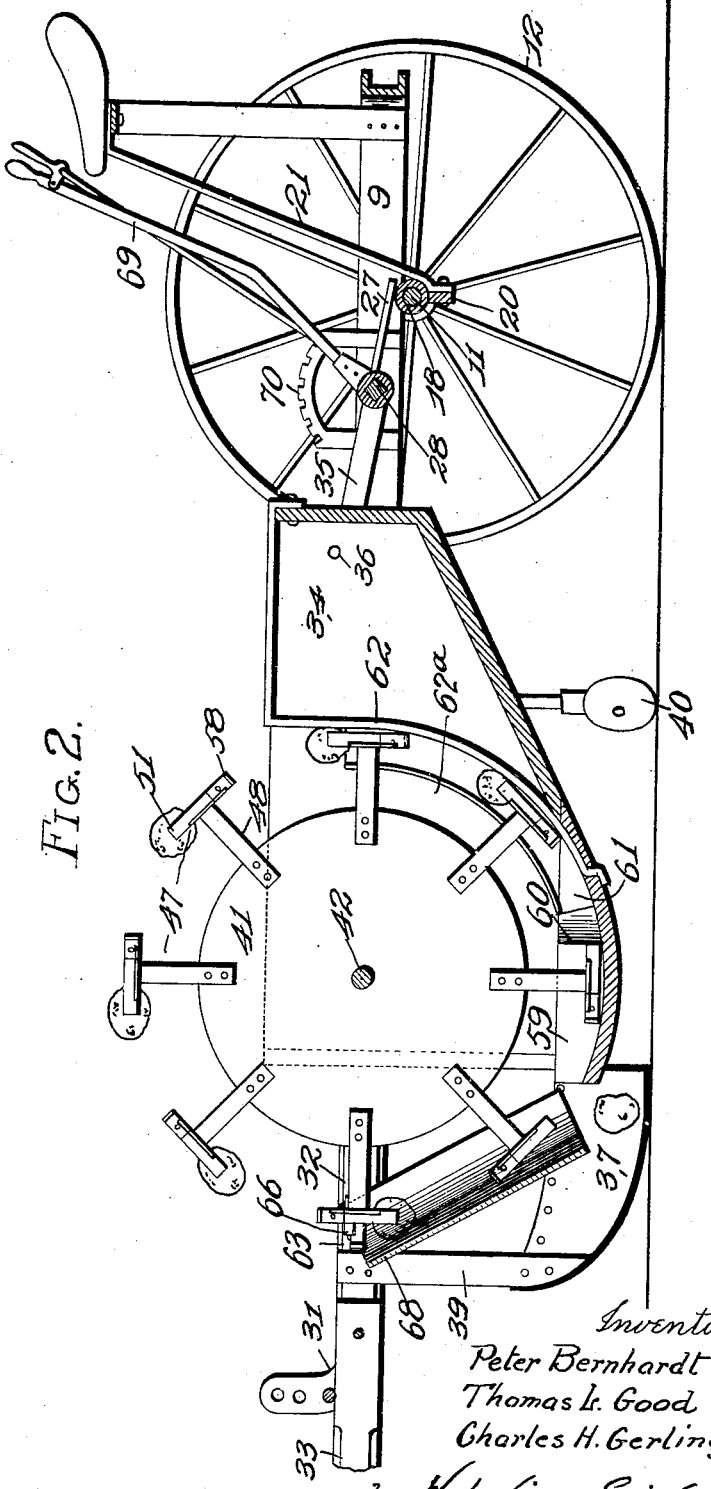

P. BERNHARDT, T. L. GOOD & C. H. GERLING.
POTATO PLANTER.
APPLICATION FILED OCT. 5, 1908.
931,178.
Patented Aug. 17, 1909.
4 SHEETS—SHEET 3.
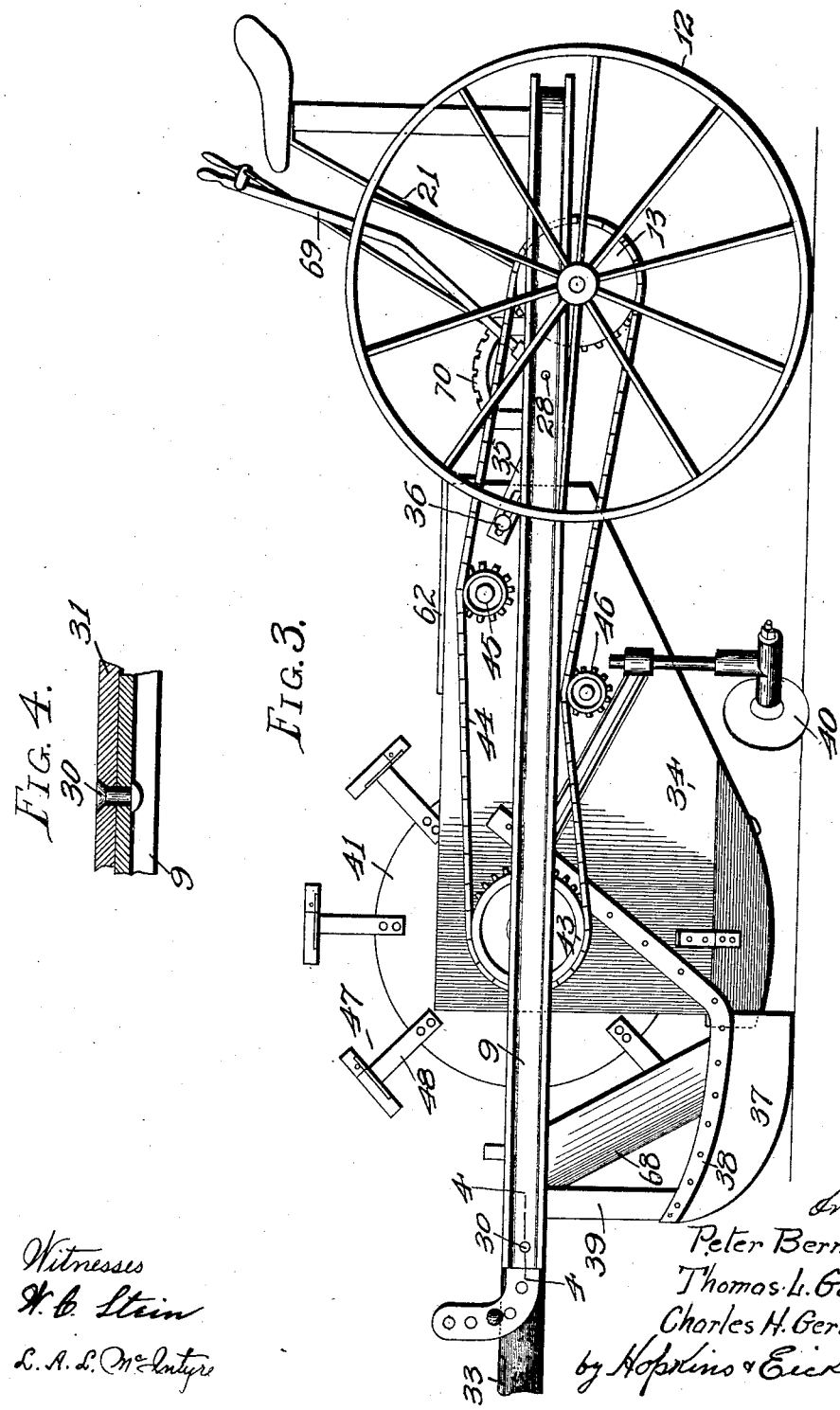

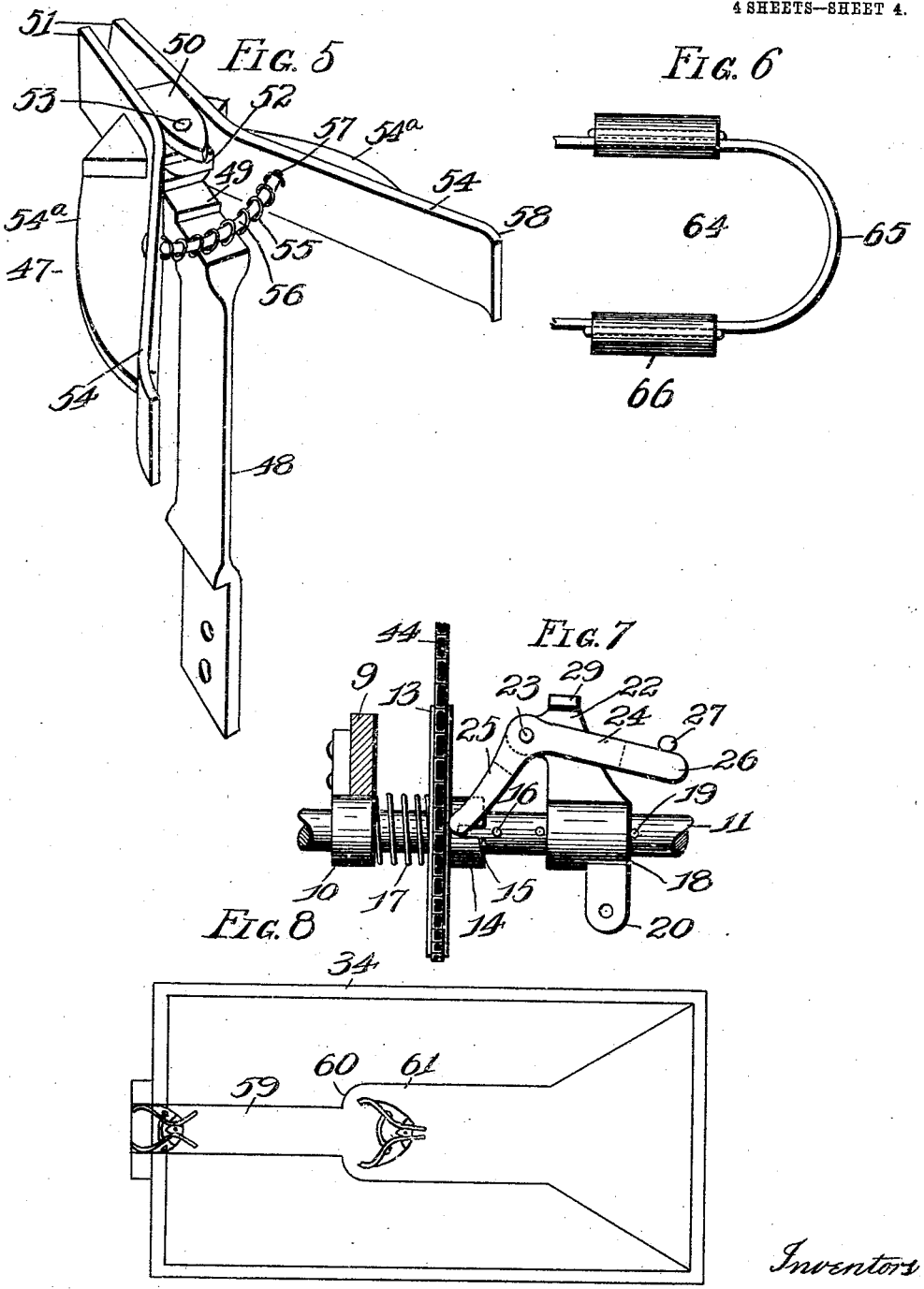

UNITED STATES PATENT OFFICE.

PETER BERNHARDT, THOMAS L. GOOD, AND CHARLES H. GERLING, OF EDWARDSVILLE, ILLINOIS, ASSIGNORS, BY MESNE ASSIGNMENTS, TO BERNHARDT MANUFACTURING COMPANY, OF EDWARDSVILLE, ILLINOIS.

POTATO-PLANTER.

No. 931,178.      Specification of Letters Patent.      Patented Aug. 17, 1909.

Application filed October 5, 1908. Serial No. 456,240.

*To all whom it may concern:*

Be it known that we, PETER BERNHARDT, THOMAS L. GOOD, and CHARLES H. GERLING, citizens of the United States, and residents of Edwardsville, Illinois, have invented certain new and useful Improvements in Potato-Planters, of which the following is a specification.

This invention relates to improvements in potato planters and has for its object to provide a potato planter with a revolving member provided with a plurality of pickers whereby the potato seed is removed from the seed receptacle, conveyed to a chute and automatically released from the picker, depositing a potato seed at intervals apart, while the potato planter is traveling and in operation.

A further object of our invention is to provide a member having a plurality of pickers to be placed in operation with the movement of the machine, the said picker member operating through a potato seed receptacle, the entire mechanism being adjustably mounted in a frame for regulating the depth the potato seed is to be planted.

Figure 1 is a top plan view of our complete potato planter. Fig. 2 is a central sectional view of the same. Fig. 3 is a side view of the potato planter. Fig. 4 is an enlarged detail sectional view of a portion of the frame showing the manner of pivotal connection, taken on the line 4—4 of Fig. 3. Fig. 5 is a detail perspective view of one of the potato pickers. Fig. 6 is a detail top plan view of the releasing mechanism by which the potato is released from the picker. Fig. 7 is a detail view of the clutch mechanism by which the potato planting mechanism is placed in and out of operation. Fig. 8 is a top plan view of the potato seed receptacle showing the passage through which the pickers operate to open and close the same.

In the construction of our invention, we provide a frame 9 to which are secured bearings 10 in which is revolubly mounted a driving axle 11 supported in drive wheels 12 and on the axle near the one side of the frame is loosely mounted a sprocket drive wheel 13, its hub 14 provided with slots 15, which are designed to engage with the projecting ends of a pin 16, passed through the axle 11. Between the sprocket wheel 13 and the bearing 10 is located an expansive coil spring 17, its tendency being to retain the slotted hub in contact with the pin 16 by which action the sprocket wheel is revolved with the movement of the axle. On the axle is also mounted loosely a pawl support 18 and held in position between pins 19 carried by the axle. To the lower portion of the pawl support is an ear 20, to which is attached one of the seat supports 21, which retain the pawl support in perpendicular position.

The projecting web 22 which forms the upper portion of the pawl support is provided with an eye through which a bolt or pin 23 is passed and on said projection and supported by the pin is pivoted the pawl 24, its tooth 25 suitably bent and arranged to contact with the surface of the sprocket wheel 13 and its projecting arm 26 projecting rearwardly with which is brought in contact the projecting arm 27 carried by the cross-bar 28. The tooth 25 of the pawl is bifurcated as shown in Fig. 1, and in that portion of the pawl fitting over the projection 22 is slotted and on the projection is provided a lug 29 to limit the upward movement of the arm 26.

The frame 9 has its forward end bent inwardly and pivotally secured by counter-sunk head-bolts 30, to the ends 31 of the potato receptacle frame 32 and between the ends 31 of the potato receptacle frame is attached the tongue 33 by which the potato planter is drawn. The potato seed receptacle frame 32 is suitably bent as shown in Fig. 1 and between its parallel sides is supported the potato receptacle 34.

On the cross-bar 28 are mounted a pair of arms 35 their free ends slotted and supported to the sides of the receptacle 34, by the bolts 36. By this arrangement and by the manipulation of the cross-bar 28, the potato receptacle can be partially raised and lowered for obtaining a proper tilt and for adjusting the depth of furrow to be made by the shoe 37 located in front of the receptacle.

The shoe 37 is supported to arms 38 which are secured to the sides of the potato receptacle 34, the front end of the shoe connected to the frame 32, by the upright 39, this shoe is located immediately in front of the potato receptacle 34, and so constructed as to make the furrow while the machine is being conveyed in which the potato seeds are dropped at regular intervals apart, and the furrow is automatically closed by the colter-disk 40, located on each side of the potato receptacle and adjustably held in position in a manner common to the art.

In the potato receptacle 34 is located a disk 41, which is mounted on a shaft 42 extending through the receptacle and on one of its projecting ends is located a sprocket wheel 43 by which the same is driven and the disk 41 revolved. The sprocket wheel 43 has operating communication with the sprocket wheel 13 located on the driving shaft 11, by the sprocket chain 44, this chain is supported on guide-wheels 45 and 46, supported to the side of the receptacle.

Upon the disk 41 is mounted a plurality of pickers 47, each being located at equal intervals apart and each of said pickers consists of an arm 48, its upper end provided with a projecting bracket 49, the end of said bracket is shaped to form a loop 50 and in the loop and pivoted to the bracket are picker-jaws 51. The pivotal feature is accomplished by the lugs 52 formed on the inner side of the picker-jaws, and so arranged as to fit one within the other; and through the same and the loop is passed a pivot 53. The picker-jaws are provided with rearward projecting arms 54, which are held apart by the expansive spring 55, supported on a suitably bent rod or bolt 56, which is permitted to freely operate in holes 57 formed in the arms, the ends of said arms are slightly bent inwardly at the point indicated by the numeral 58, so as to avoid as much friction as possible while the same are contacting with the releasing devices hereinafter fully described. The arms are each provided with a projecting flange 54ª which acts as a guard preventing the potatoes from contacting with the ends of the curved rod or bolt when the arms are compressed.

The bottom of the receptacle 34 is provided with a passage 59 of sufficient width to cause the jaws of the pickers to remain in open position while passing through the same, and after the pickers have passed the point indicated by the numeral 60, the jaws will close by the action of the expansive spring and permit the arms 54 to spread outwardly in the wider groove 61, which is a continuation of the groove 59. At this point the pickers have a tendency to raise the potato which has been grasped by the open jaws while passing through the passage 59, and the same is firmly held between the jaws and is protected from the remainder of the potatoes by the guard 62 located in the receptacle as shown clearly in Figs. 1 and 2. The guard 62 is provided with projecting sides 62ª, their ends bent inwardly forming a slot 62ᵇ of sufficient width to permit the passage of the arms 48 of the pickers, thus forming a channel through which the pickers will each carry a section of seed potato. The purpose of this construction is to prevent the potatoes from packing themselves at this point and to insure the accurate action of the pickers. This construction is shown clearly in Figs. 1 and 2.

During the revolution of the disk 41 the potatoes which are carried in the picker-jaws are released therefrom at the point indicated by the numeral 63, at which point is located the releasing mechanism 64, consisting of a yoke 65 carrying a pair of rollers 66, this yoke being securely fastened to the front side of the receptacle at the point indicated by the numeral 67 and to the chute 68 which is diagonally located in the front of the receptacle and beneath the releasing mechanism and is rigidly held in position by securing its ends to the front side of the receptacle and to the frame 32. As the arm 54 contacts with the roller 66 the compression releases the jaws and permits the potato to roll down the chute and lodge in the furrow formed by the shoe 37.

To the cross-bar 28 is attached a hand lever 69, and on the frame 9 is located a toothed segment 70, with which a pawl carried by the hand lever is designed to come in contact to retain the receptacle in its adjusted position by means of the arms 35 carried by the cross-bar.

When the planting is completed and it is desired to convey the machine homeward, the operator pulls upon the hand lever 69, raising the receptacle. In this position the projecting arm 27 will contact with the pawl 24, releasing the sprocket wheel 13 from the pin 16 on the axle, thus permitting the wheels 12 to revolve independently of the planting mechanism.

In order to prevent the potatoes from coming in contact with the disk 41, I place within the receptacle on each side of the disk a shield 71, their ends 72 secured to the inner surface of the front end of the receptacle and their ends 73 supported by the braces 74. This will prevent the potatoes from packing around the disk and hinder the free movement of the same.

Beneath the shield is sufficient space to permit the potatoes to pass within the passage-way 59 and 61 so that the pickers while passing through will grasp a section of seed potato and carry it to the releasing device where it is deposited into the furrow.

Having fully described our invention what we claim is:

1. In a potato planter, the combination of a frame; a potato seed receptacle tiltingly mounted within said frame; a channel mounted in the rear portion of the receptacle; a revolving picker-disk vertically and axially mounted in the receptacle; a plurality of pickers mounted on the disk, said pickers comprising a pair of spring-controlled jaws; means for operating the jaws to grasp a section of seed potato and to convey the same through said channel and to the front end of the receptacle; a yoke secured to the front end of the receptacle; a pair of rollers mounted on said yoke and adapted to contact with and upon the jaws of the picker to release the potato seed; and a chute adapted to convey the potato seed so released to the furrow, substantially as described.

2. In a potato planter, the combination of a frame; a potato seed receptacle tiltingly mounted within said frame; a channel mounted in the rear portion of the receptacle; a revolving picker-disk vertically and axially mounted in the receptacle; a plurality of pickers mounted on the disk, said pickers comprising a pair of spring-controlled jaws; means for operating the jaws to grasp a section of seed potato and to convey the same through said channel and to the front end of the receptacle; a yoke secured to the front end of the receptacle; a pair of rollers mounted on said yoke and adapted to contact with and upon the jaws of the picker to release the potato seed; a chute adapted to convey the potato seed so released to the furrow; a shoe carried by the frame and adapted to make a furrow; and a colter-disk mounted behind said shoe and adapted to close the furrow, substantially as described.

In testimony whereof, we have signed our names to this specification, in presence of two subscribing witnesses.

PETER BERNHARDT.
THOMAS L. GOOD.
CHARLES H. GERLING.

Witnesses:
J. F. NESHNER,
GEO. C. STULLKEN.